UNITED STATES PATENT OFFICE.

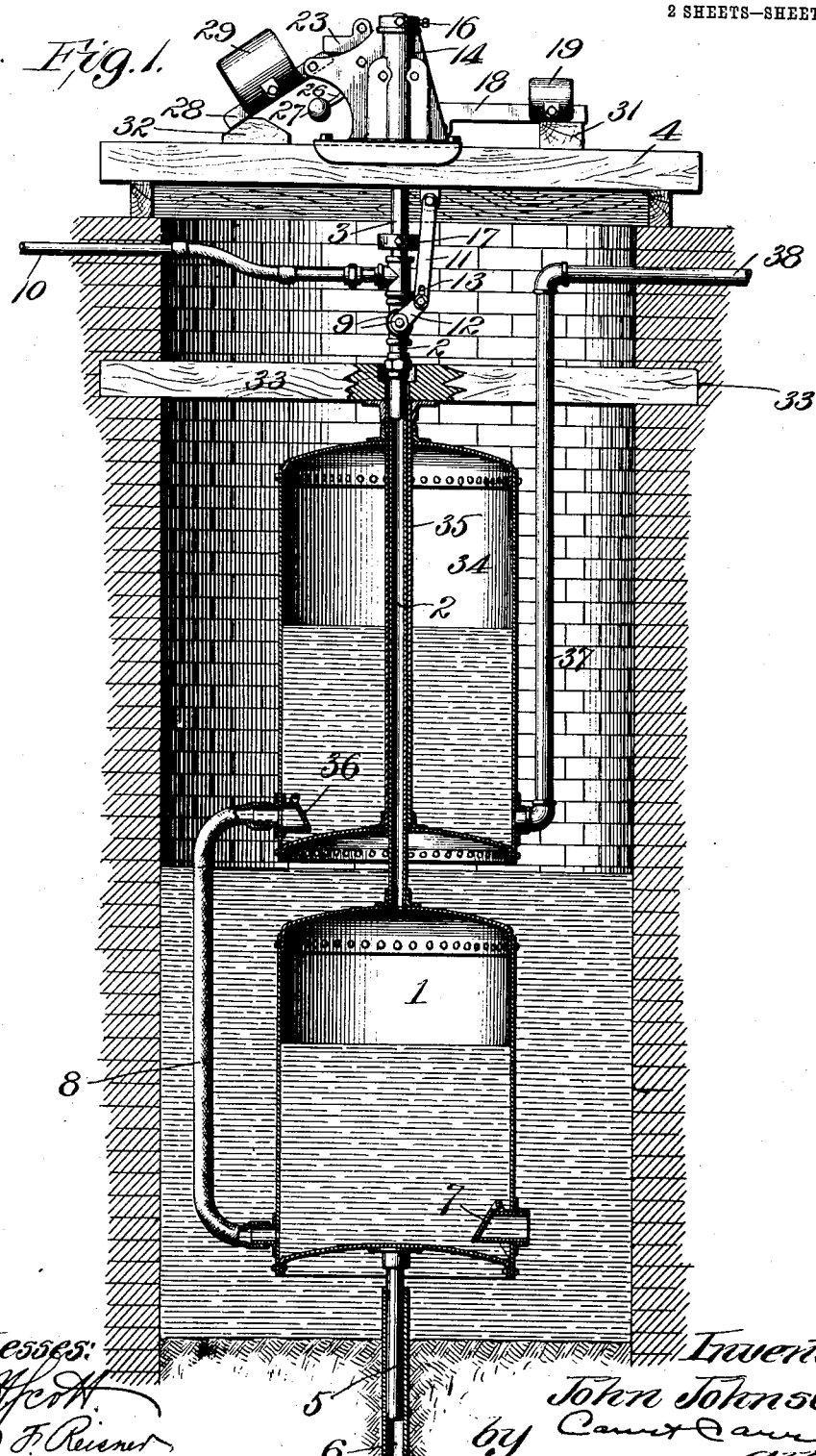

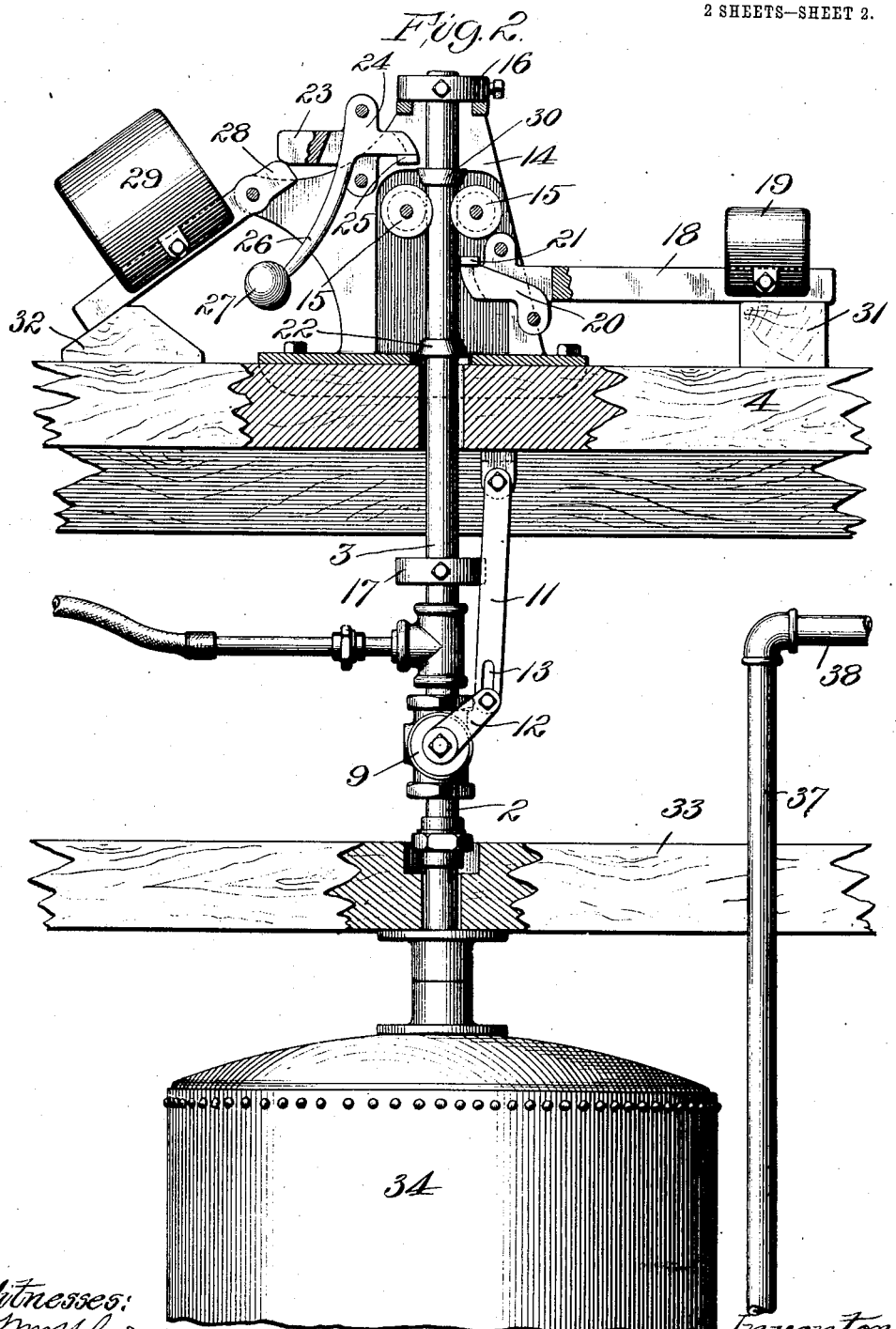

JOHN JOHNSON, OF OVERLAND PARK, MISSOURI, ASSIGNOR TO THE COUNTRY HYDRANT COMPANY, OF ST. LOUIS, MISSOURI, A CORPORATION OF MISSOURI.

AUTOMATIC WATER-SUPPLY SYSTEM.

No. 813,558.  Specification of Letters Patent.  Patented Feb. 27, 1906.

Application filed January 30, 1905. Serial No. 243,220.

*To all whom it may concern:*

Be it known that I, JOHN JOHNSON, a citizen of the United States, and a resident of Overland Park, county of St. Louis, and State of Missouri, have invented a new and useful Improvement in Automatic Water-Supply Systems, of which the following is a specification.

My invention relates to automatic water-supply systems, and has for its principal objects to secure a continuous stream of water, to provide means for securing a continuous stream of water from an intermittently-filling tank, to provide a novel mechanism for controlling the ascent and descent of a floating tank, and other objects hereinafter more fully appearing.

My invention consists in the parts and in the arrangements and combinations of parts hereinafter described and claimed.

In the accompanying drawings, forming a part of this specification, and wherein like symbols refer to like parts wherever they occur, Figure 1 is a vertical sectional view through a well and the tanks therein, the controlling mechanism being shown in elevation. Fig. 2 is a view, on an enlarged scale, partially in section, showing the controlling mechanism.

Automatic water-supply systems employing a floating tank are subject to the objections that the flow of water stops during the time the tank is refilling. Though the filling period is short, the interruption of the stream of water is often inconvenient. The subject-matter of the present invention overcomes this objection.

In a well, cistern, tank, or the like a tank 1 is placed. It is guided by a pipe 2 and rod 3, passing upwardly through the well-platform 4, and by a rod 5, passing downwardly into a tubular guide 6, inserted in the bottom of the well. Near the bottom of the tank a flap-valve 7 is arranged to permit admission of water, but prevent its escape. Water is discharged through a flexible pipe or tube 8, communicating with the tank near its bottom. The pipe 2 communicates with the tank at the top and is provided with a three-way cock 9. Above the cock the pipe is connected by a flexible pipe or tube with a pipe 10, leading to a source of compressed air. The tank 1 may rise and fall within certain limits. The cock 9 is turned by means of the reciprocation of the tank, a link 11, pivoted on the platform 4, being connected to an arm 12 on the cock. The link is provided with a slot 13 at the end connected to the arm of the cock, so as to prevent the turning of the cock until the full movement of the tank has begun.

The rise and fall of the tank is controlled by mechanism which will now be described. A frame 14 is mounted on the platform 4. The guide-rod 3 of the tank passes through the frame and is guided by grooved rollers 15, mounted therein. The rod is provided with an adjustable collar 16, arranged above the frame to strike the top of the latter at the lower limit of the movement of the rod and the tank, and it is provided with a second adjustable collar 17, arranged below the platform to strike the latter at the upper limit of the movement of the rod and the tank.

When the tank contains such an amount of water that the combined weight of the tank and the water therein is greater than the buoyant force of the water displaced by the tank, the tank will tend to sink. However, it should not descend until it is full. On the other hand, when the tank has been emptied to such an extent that the combined weight of the tank and the water remaining therein is less than the buoyant force of the water displaced by the tank the tank will tend to rise; but it should not rise until it is nearly empty. To control the rise and fall of the tank, control-levers are provided.

A lever 18, provided with an adjustable poise 19, is pivoted in the frame 14. The inner end of the lever is bifurcated. A dog 20 is pivoted between the bifurcations and is provided with laterally-extending fingers 21, which rest upon the top of the lever. The dog projects inwardly beyond the end of the lever and into the path of a frusto-conical collar 22 on the guide-rod 3. As the tank rises the collar 22 will trip the dog, and the lever 18 will offer no resistance to the upward movement; but when the tank descends the collar will engage the dog in the opposite direction. The dog and lever are locked against relative movement in this direction by means of the fingers 21 and must move as if the dog were a rigidly-connected part of the lever. Hence the collar 22 cannot pass the dog until the lever is tilted. To do this there must be so much water in the tank that the combined weight of the water and tank exceeds the buoyant force of the water displaced by the tank by an amount sufficient to counterbalance the poise 19 on the lever 18.

At a point in the frame higher than the pivot of the lever 18 a lever 23 is pivoted. At its inner end it is bifurcated and carries a dog 24, projecting inwardly beyond the end of the lever. Fingers 25 on the dog engage the lower side of the lever and are held in engagement therewith by means of a downwardly-extending arm 26 and weight 27, integral with the dog. The outer end of the lever 23 bears upon a lever 28, pivoted on the frame 14 and carrying an adjustable poise 29 upon the other side of its fulcrum. The dog 24 projects into the path of a frusto-conical collar 30 on the guide-rod 3. As the tank, rod, and collar descend the dog 24 will be tripped, but not as they ascend. Thus the upward movement of the tank is resisted. The tank cannot rise until it has been emptied to such an extent that the buoyant force of the water displaced by the tank exceeds the combined weight of the tank and the water therein by an amount sufficient to counterbalance the poise 29 and the levers 23 and 28.

The outer ends of the levers 18 and 28 normally rest upon stops 31 and 32, respectively mounted on the platform.

The above-described controlling mechanism is more fully described and claimed in my copending application filed October 22, 1904, Serial No. 229,612.

The parts so far described operate as follows: Consider the parts in the position shown in the drawings. The tank 1 is in its lowermost position and the collar 16 is resting on the top of the frame of the controlling mechanism. The tank is comparatively full and communication with the source of compressed air is open, so that the water is under pressure. This causes the closing of the flap-valve 7 and will cause the discharge of water through the pipe 8. When the tank is emptied to such an extent that the buoyancy of the water displaced by the tank exceeds the weight of the tank and the water therein, it will rise until the collar 30 strikes the dog 24 on the lever 23. The tank will be held at that point until the tank is further emptied, and the excess of the buoyant force is sufficient to counterbalance the poise 29 and levers 23 and 28. The lever 23 will then be tilted and the tank will be permitted to rise until the collar 17 strikes the platform. The lever 18 offers no resistance to the upward movement of the tank as the collar 22 trips the dog 20. When the tank 1 rises, the cock 9 is turned and the compressed air is cut off and communication between the interior of the tank and the atmosphere is opened. Now the pressure of the water outside of the tank will open the flap-valve 7, and the tank will be filled. As soon as the tank has filled to such an extent that the weight of the tank and the water therein exceeds the buoyant force of the water displaced by the tank it will sink until the collar 22 engages the dog 20 on the lever 18. It will be held at that point until the excess of the weight of the tank and water therein over the buoyant force is sufficient to counterbalance the poise 19, when the lever 18 will tilt and the tank will be permitted to sink until the collar 16 strikes the top of the frame 14 of the control mechanism.

During the time the tank is refilling the water therein is relieved from the pressure of the compressed air. Hence the water cannot be forced through the discharge-pipe 8 to the main. To supply water during the time the tank 1 is filling, the following means is provided: A beam 33 is secured in the walls of the well, cistern, tank, or the like, above the tank 1, preferably. From the beam a tank 34 is suspended. It is preferably larger than the tank 1 and is provided with a central pipe 35, extending from top to bottom, through which the air-pipe 2 passes. Near the bottom it is provided with a flap-valve 36, arranged to admit water, but to prevent its escape. The flexible pipe 8 communicates with the part controlled by this valve. A discharge-pipe 37 leads from near the bottom of the tank to a main 38. When compressed air is admitted to the tank 1, the water will be forced from the tank through the pipe 8 and into the tank 34 and main 38. As the tank 34 fills the air trapped therein will be compressed until it is under substantially the same pressure as the air admitted to the tank 1. When this condition has been brought about, the water will be forced through the main from the tank 1 just as if the tank 34 were not present. When, however, the tank 1 has been emptied and is refilling, the water-supply will not be discontinued. As soon as the pressure in the tank 1 is cut off the pressure in the tank 34 will close the flap-valve 36. The water in the tank is under substantially the same pressure as if the tank were in communication with the source of compressed air. Thus there is present the requisite pressure to force the water in the tank 34 through the mains. The tank 34 should be large enough to hold water enough to supply the maximum demand during the time required to refill the tank 1 and to hold air in such volume when compressed that the expansion permitted by the discharge of the maximum volume of water will not reduce the pressure below the working point.

The tank 34 has been shown located in the well, and this construction is preferred, for it is then out of the way and protected from the cold of winter and the heat of summer. However, it may be placed above ground, if desired. It has been shown above the level of the water in the well; but obviously it might be under water.

Obviously the system is capable of considerable modification within the scope of my invention, and therefore I do not wish to be limited to the specific construction shown and described.

What I claim as my invention, and desire to secure by Letters Patent, is—

1. An automatic water-supply system comprising a submerged tank arranged to move up and down and having means for the admission and discharge of water, an auxiliary tank arranged above said tank and having a central longitudinal opening therethrough and means for the admission and discharge of water, an air-pipe extending through said opening and communicating with said submerged tank, a cock in said air-pipe arranged to be automatically operated by the up-and-down movement of said submerged tank, means to regulate the movement of said submerged tank, and means of communication between said tanks whereby water from said submerged tank may enter said auxiliary tank and compress air trapped therein.

2. An automatic water-supply system comprising a fixed tank, a vertically-movable submerged tank, a pipe connected to said movable tank and provided with a valve, means for automatically opening said valve by the movement of said movable tank, an inlet-valve in said movable tank, means having a flexible element connecting said tanks, permitting a flow of water from said movable tank to said fixed tank and preventing a flow in the opposite direction, means for the discharge of water from said fixed tank, and means to control the movement of said movable tank comprising a frame, a rod arranged to move with said movable tank and provided with separated collars, a lever pivotally mounted on said frame and provided with a pivoted dog projecting into the path of one of said projections, said lever and said dog having interlocking means whereby said dog will move with said lever in one direction and will move with respect to said lever in the opposite direction, an adjustable poise on said lever, a lever pivoted on said frame and having a part projecting into the path of the other of said collars on said rod, and means to oppose the movement of said lever in one direction.

In testimony whereof I have signed my name to this specification, in the presence of two subscribing witnesses, at St. Louis, Missouri, this 27th day of January, 1905.

JOHN JOHNSON.

Witnesses:
FRED F. REISNER,
J. B. MEGOWN.